US007532968B2

United States Patent
Kadota

(10) Patent No.: US 7,532,968 B2
(45) Date of Patent: May 12, 2009

(54) VEHICLE DRIVING FORCE CONTROL APPARATUS

(75) Inventor: Keiji Kadota, Zama (JP)

(73) Assignee: Nissan Motor Co., Ltd., Yokohama (JP)

(*) Notice: Subject to any disclaimer, the term of this patent is extended or adjusted under 35 U.S.C. 154(b) by 164 days.

(21) Appl. No.: 10/641,089

(22) Filed: Aug. 15, 2003

(65) Prior Publication Data
US 2004/0044458 A1 Mar. 4, 2004

(30) Foreign Application Priority Data
Sep. 4, 2002 (JP) ............................. 2002-259160

(51) Int. Cl.
*G06F 19/00* (2006.01)
*F18H 61/08* (2006.01)
(52) U.S. Cl. ............................ 701/55; 701/51; 477/97; 477/901; 475/254; 180/65.2
(58) Field of Classification Search ................ 701/22, 701/54, 110, 5, 55, 56, 51, 64; 180/65.2, 180/65.8, 652, 654, 243, 242, 65.3, 65.4; 477/97, 901, 3, 15, 34; 322/16, 22; 74/199; 475/5, 149, 153, 254
See application file for complete search history.

(56) References Cited

U.S. PATENT DOCUMENTS

| | | | | |
|---|---|---|---|---|
| 6,198,256 B1 * | 3/2001 | Miyazaki et al. | ............... | 322/16 |
| 6,205,379 B1 * | 3/2001 | Morisawa et al. | ............. | 701/22 |
| 6,330,498 B2 * | 12/2001 | Tamagawa et al. | ............ | 701/22 |
| 6,338,391 B1 * | 1/2002 | Severinsky et al. | ......... | 180/65.2 |
| 6,434,469 B1 | 8/2002 | Shimizu et al. | | |
| 6,442,454 B1 | 8/2002 | Akiba et al. | | |
| 6,503,170 B1 * | 1/2003 | Tabata | ......................... | 477/97 |
| 6,524,217 B1 * | 2/2003 | Murakami et al. | ............. | 477/5 |
| 6,569,055 B2 * | 5/2003 | Urasawa et al. | ................. | 477/5 |
| 6,575,870 B2 * | 6/2003 | Kitano et al. | .................. | 477/3 |
| 6,638,195 B2 * | 10/2003 | Williams | ....................... | 477/5 |
| 6,877,578 B2 * | 4/2005 | Krzesicki et al. | ............ | 180/243 |

(Continued)

FOREIGN PATENT DOCUMENTS

JP 55-138129 U 10/1980

(Continued)

*Primary Examiner*—Ronnie Mancho
(74) *Attorney, Agent, or Firm*—Global IP Counselors, LLP

(57) ABSTRACT

A vehicle driving force control apparatus is provided to prohibit a change in a shift schedule that will cause insufficient power generation of a generator that supplies power to an electric motor to drive a first drive wheel. The vehicle driving force control apparatus has a shift schedule change section, a power sufficiency determining section and a shift schedule change prohibit section. The shift schedule change section is configured to change a shift schedule of a transmission of the main drive source. The power sufficiency determining section is configured to determine whether generated power of the generator will be insufficient by a change in the shift schedule by the shift schedule change section, when an electromotive force of the generator is driving the electric motor that supplies torque to the first drive wheel. The shift schedule change prohibit section is configured to prohibit a change of the shift schedule by the shift schedule change section, upon the power sufficiency determining section determining that the generated power of the generator will be insufficient.

12 Claims, 9 Drawing Sheets

U.S. PATENT DOCUMENTS

| | | |
|---|---|---|
| 2001/0011050 A1* | 8/2001 | Yamaguchi et al. ............ 477/3 |
| 2001/0017225 A1* | 8/2001 | Yamamoto et al. ......... 180/65.2 |
| 2002/0094908 A1 | 7/2002 | Urasawa et al. |
| 2003/0010559 A1 | 1/2003 | Suzuki |
| 2003/0064858 A1 | 4/2003 | Saeki et al. |
| 2003/0089539 A1 | 5/2003 | Kadota |
| 2003/0151381 A1 | 8/2003 | Kadota et al. |

FOREIGN PATENT DOCUMENTS

| | | |
|---|---|---|
| JP | 2001-132832 A | 5/2001 |
| JP | 2001-138764 A | 5/2001 |
| JP | 2002-218605 A | 8/2002 |
| JP | 2003-025861 A | 1/2003 |
| JP | 2003-130200 A | 5/2003 |
| JP | 2003-156079 A | 5/2003 |
| JP | 2003-209902 A | 7/2003 |

* cited by examiner

VEHICLE DRIVING FORCE CONTROL APPARATUS

BACKGROUND OF THE INVENTION

1. Field of the Invention

The present invention relates to a vehicle driving force control apparatus configured so as to drive an electric motor that transmits drive torque to subordinate wheels by means of electromotive force generated by a generator.

2. Background Information

This type of vehicle driving force control apparatus has been proposed for both front and rear wheel drive vehicles (refer to Japanese Patent Utility Model No. 55-138129 (1st page, FIG. 2)) in which one pair of wheels from among the front wheels and rear wheels are driven by the power of an internal combustion engine through a transmission as the main drive wheels, and the other pair of wheels, from among the front wheels and rear wheels, is driven by an electric motor. The driving force of the internal combustion engine drives a generator and the electromotive force generated by this generator is supplied to an electric motor. Thereafter, when the accelerator pedal is stepped down on and the vehicle speed is less than a present value, the electric motor operates to drive the front wheels and rear wheels.

In view of the above, it will be apparent to those skilled in the art from this disclosure that there exists a need for an improved vehicle driving force control apparatus. This invention addresses this need in the art as well as other needs, which will become apparent to those skilled in the art from this disclosure.

SUMMARY OF THE INVENTION

It has been discovered that in the above mentioned driving force control apparatus that since the electric motor is driven by the electromotive force generated by the generator that is driven by the internal combustion engine, if the generator cannot overcome the counterelectromotive force of the electric motor, it cannot generator power. In other words, when the engine rotational speed is increased, the rate of increase will be small with a low engine rotational speed and then the rate grows larger as the vehicle speed increases. In contrast, the counterelectromotive force of the electric motor is "0" when the engine rotational speed is "0" and then increases at a fixed rate of increase following increases in the engine rotational speed. Because of this, the power generation capacity line of the generator is less then the counterelectromotive force of the electric motor during the period between when the engine rotational speed is "0" until a designated engine rotational speed is reached. Consequently, power generation current generated by the generator cannot flow and the electric motor cannot generate drive torque. If, however, the engine rotational speed increases and exceeds the designated engine rotational speed, the power generation current generated by the generator will increase in response to this thereby allowing the electric motor to generate drive torque.

In the above mentioned driving force control apparatus, a transmission is equipped on the output side of the internal combustion engine. When the vehicle speed is fixed, the internal combustion engine rotational speed varies according to the variable speed ratio of the transmission and the amount of power generated by the generator driven by this internal combustion engine varies in response to the internal combustion engine rotational speed.

In contrast, vehicles equipped with a traction control apparatus to prevent acceleration slippage of the drive wheels are controlled to prevent acceleration slippage when acceleration slippage in the drive wheels occurs such as when travelling on road surfaces with a low frictional coefficient by changing the upshift schedule. The upshift schedule changes the upshift variable speed line that upshifts from the 1 st speed gear position to the 2nd speed gear position of the automatic transmission to a high vehicle speed compared with a normal variable speed line and then reducing the engine rotational speed or providing a braking force to the drive wheels using the throttle opening degree or cutting fuel while controlling the upshift of the automatic transmission.

In this manner, if the shift schedule is changed by the traction control apparatus so as to control upshifts while acceleration slippage occurs and the acceleration slippage cancelled, the shift schedule will return to a shift schedule that uses the original normal variable speed line. Because of this, the engine rotational speed changes to a comparatively high state and the amount of power generated by the generator can overcome the counterelectromotive force of the electric motor allowing the generated current to be supplied to the electric motor by means of controlling the upshifting of the automatic transmission from the 1 st speed gear position to the 2nd speed gear position even if the vehicle speed exceeds the normal variable speed line while acceleration slippage occurs when driving the electric motor using the amount of power generated by the generator in vehicles equipped with a traction control apparatus. Because the shift schedule returns to a shift schedule that uses the original normal variable speed line when the acceleration slippage is cancelled in a state in which the electric motor is being driven, there is an unsolved problem of the danger of the automatic transmission shifting up to the 2nd speed gear position and the engine rotational speed decreasing thereby resulting in insufficient power generation or the impossibility of power generation.

Thereupon, an object of the present invention is to solve of the above-mentioned problems and provide a vehicle driving force control apparatus that can prevent the occurrence of insufficient power generation or the impossibility of power generation by the generator.

In order to achieve the above-mentioned object, a vehicle driving force control apparatus of a vehicle is provided that has generator driven by a main drive source and an electric motor driven by electric power from the generator to supply torque to a first drive wheel. The vehicle driving force control apparatus has a shift schedule change section, a power sufficiency determining section and a shift schedule change prohibit section. The shift schedule change section is configured to change a shift schedule of a transmission of the main drive source. The power sufficiency determining section is configured to determine whether generated power of the generator will be insufficient by a change in the shift schedule by the shift schedule change section, when an electromotive force of the generator is driving the electric motor that supplies torque to the first drive wheel. The shift schedule change prohibit section is configured to prohibit a change of the shift schedule by the shift schedule change section, upon the power sufficiency determining section determining that the generated power of the generator will be insufficient.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
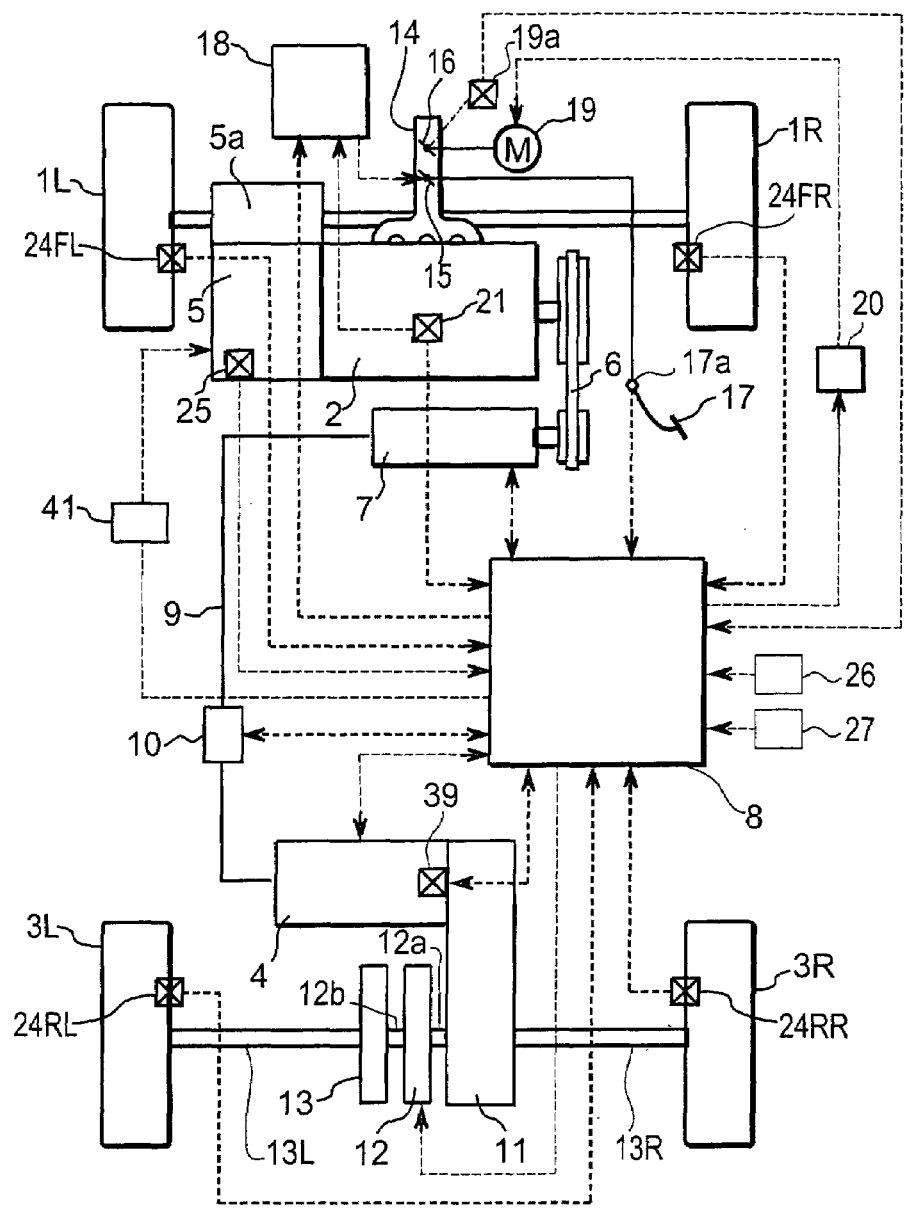
FIG. 1 is a schematic block diagram of a vehicle equipped with a vehicle driving force control apparatus in accordance with preferred embodiments of the present invention.
Figure 2:
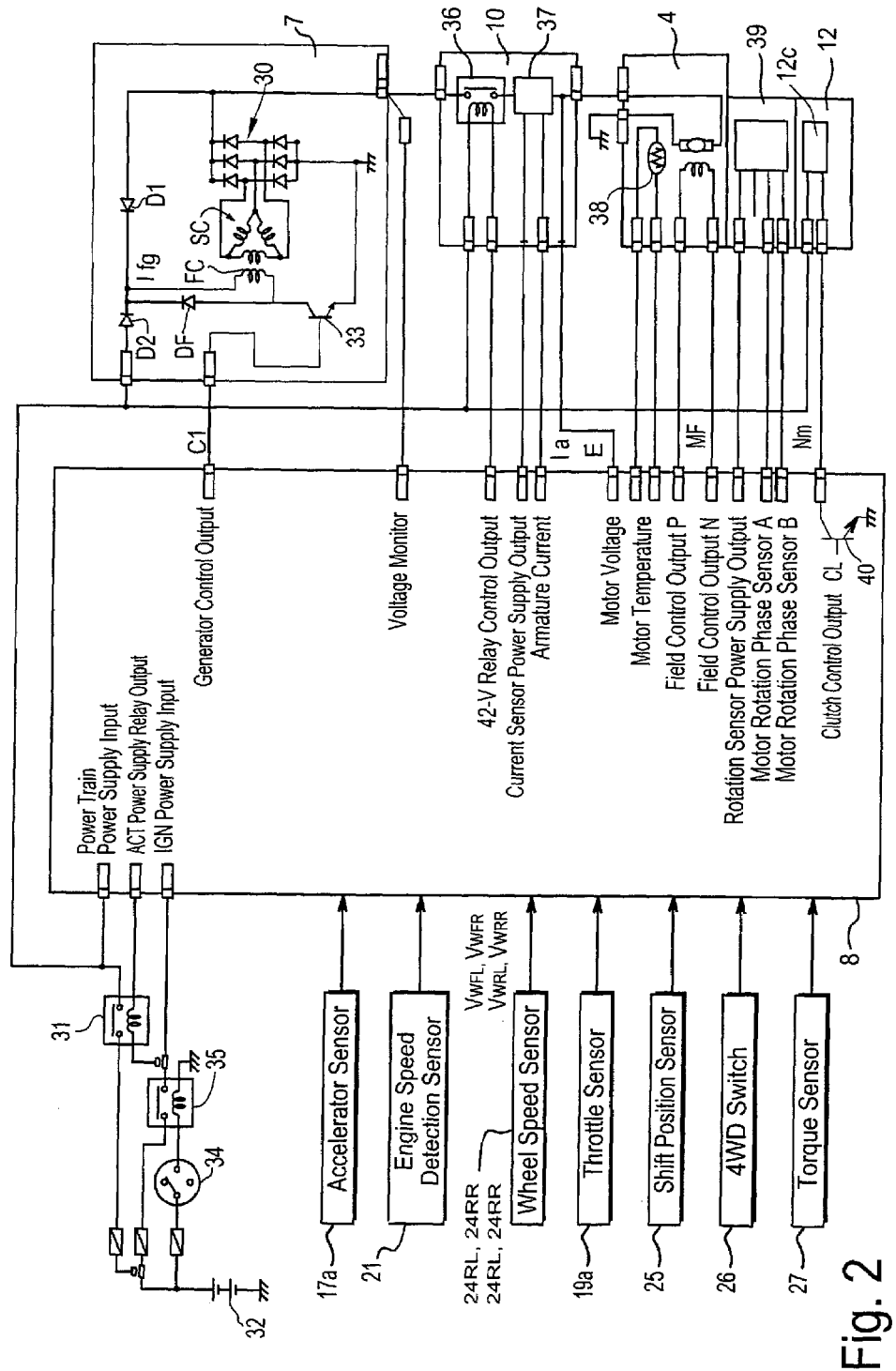
FIG. 2 is a block diagram showing a control system configuration for the vehicle driving force control apparatus illustrated in FIG. 1 in accordance with the illustrated embodiments of the present invention.

Referring initially to FIGS. 1 and 2, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels.

A portion of the engine output torque Te of the internal combustion engine 2 is transmitted to the left and right front wheels 1L and 1R through an automatic transmission 5, equipped with a torque converter, and a differential gear 5a in a conventional manner. An endless drive belt 6 transfers power from the internal combustion engine 2 to a generator 7, which supplies electrical energy to the electric motor 4. Thus, a portion of the engine output torque Te of the internal combustion engine 2 is transmitted to the generator 7 through the endless belt drive 6 to supply electrical energy to the electric motor 4.

The generator 7 rotates at a rotational speed Ng that is equal to the product of the rotational speed Ne of the internal combustion engine 2 and the pulley ratio of the endless drive belt 6. The load placed on the internal combustion engine 2 by the generator 7 due to the field current Ifg of the generator 7 is adjusted by the 4WD controller 8 to generate a voltage corresponding to the load torque. The generator 7 then generates an electromotive force in proportion to this load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner. Each of the left and right output sides of the differential gear 13 are linked to the left and right rear wheels 3L and 3R through the drive shafts 13L and 13R, respectively.

The clutch 12 is preferably an electromagnetic clutch that connects and disconnects in response to a clutch control command issued from the 4WD controller 8. Of course, a hydraulic clutch can be used for clutch 12 is certain situations to carry out the present invention. Thus, the clutch 12 transmits torque from the electric motor 4 to the rear wheels 3L and 3R at a torque transfer rate corresponding to the clutch control command from the 4WD controller 8. The clutch 12 has an input shaft 12a coupled to the electric motor 4 via the reduction gear 11, and an output shaft 12b coupled to the rear wheels 3L and 3R via the differential gear 13. Preferably, the clutch 12 is turned on to perform an engagement operation in which the input and output shafts 12a and 12b are connected such that the drive torque from the electric motor 4 is transmitted to the rear wheels 3L and 3R. When the clutch 12 is turned off, a disengagement or release operation occurs in which the input and output shafts 12a and 12b are disengaged such that the drive torque from the electric motor 4 is no longer transmitted to the rear wheels 3L and 3R. Thus, when the clutch 12 is engaged, the vehicle is in a four-wheel (multi-wheel) drive state in which all of the wheels 1L, 1R, 3L and 3R are driven. When the clutch 12 is released, the vehicle is in a two-wheel (non-all wheel) drive state in which only the front wheels 1L and 1R are driven by the internal combustion engine 2.

According to the present invention, as explained below in more detail, a shift schedule change prohibit method is used to prohibit changes in a shift schedule which will result in the generator 7 generating insufficient power in a drive state of, for example, four-wheel drive, in which the electric motor 4 drives the subordinate drive wheels 3L and 3R. Because of this, an effect is obtained that makes it possible to maintain a shift schedule when that shift schedule is changed from a normal variable speed line to a high vehicle speed thereby reliably preventing reductions in the rotational speed of the main drive source due to the transmission upshifting and to appropriately control the drive torque of the electric motor 4.

A main throttle valve 15 and a sub throttle valve 16 are disposed inside the intake passage 14 (e.g., an intake manifold) of the internal combustion engine 2. The throttle opening of the main throttle valve 15 is adjusted and controlled in accordance with the amount of depression of the accelerator pedal 17, which also constitutes or functions as an accelerator position detecting device or sensor, or a throttle opening instructing device or sensor. In order to adjust the throttle opening degree of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 17a that detects the depression amount of the accelerator pedal 17 or the degree of opening of the main throttle valve 15. The depression amount detection value from the accelerator sensor 17a is outputted as a control signal to the 4WD controller 8. The accelerator sensor 17a constitutes an acceleration or throttle instruction sensor. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening degree in response to drive signals from a motor controller 20. Specifically, the throttle opening degree of the sub throttle valve 16 is adjusted and controlled by the rotational angle of the stepper motor 19, which corresponds to the step count. The rotational angle of the stepper motor 19 is adjusted and controlled by a drive signal from the motor controller 20. The sub throttle valve 16 is provided with a throttle sensor 19a shown in FIG. 2. The step count of the stepper motor 19 is feedback-controlled based on the throttle opening detection value detected by this throttle sensor 19a. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed Ne of the internal combustion engine 2. The engine rotational speed sensor 21 outputs a control signal that is indicative of the engine rotational speed Ne to both the engine controller 18 and the 4WD controller 8.

In addition, a shift position sensor 25 is installed that functions as a gear ratio detection device or section detects the shift position of the aautomatic transmission 5. The shift position detected by the shift position sensor 25 is input to the 4WD controller 8. Even further, the 4WD switch 26 is installed close to the driver's seat that selects a drive state or mode. The switch signal of this 4WD switch 26 is input to the 4WD controller 8. The 4WD switch 26 forms part of a drive mode selection section of the present invention.

The wheels 1L, 1R, 3L and 3R are provided with wheel speed sensors 24FL, 24FR, 24RL, and 24RR, respectively. Each speed sensor 24FL, 24FR, 24RL, and 24RR outputs a pulse signal corresponding to the rotational speed of the respective wheel 1L, 1R, 3L and 3R to the 4WD controller 8. Thus, the wheel speeds $V_{WFL} \sim V_{WRR}$ detected by these wheel speed sensors 24FL, 24FR, 24RL, and 24RR are also output to the 4WD controller 8. Each of the pulse signals serves as a wheel speed detection value indicative of the rotational speed of the respective wheel 1L, 1R, 3L and 3R, respectively. The wheel speed sensors 24RL and 24RR constitute an output shaft rotational speed detector or sensor of the clutch 12.

As shown in FIG. 2, the generator 7 has a three-phase stator coil SC connected in a delta formation and a field coil FC. Each of the connection nodes of the stator coil SC is connected to a rectifying circuit 30 made up of diodes and the rectifying circuit 30 delivers a maximum DC voltage Vg of, for example, 42 V.

One end of the field coil FC is connected to the output side of the rectifying circuit 30 through a diode D1 and to a battery 32 of a prescribed voltage (e.g., 12 volts) through a diode D2 in the reverse direction and a 4WD or 12-volt relay 31. The other end of the field coil FC is connected to the cathode sides of the diodes D1 and D2 through a flywheel diode DF in the forward direction, and is grounded through a bipolar transistor 33 comprising a voltage regulator.

The 12-volt battery 32 supplies operating electric power to the 4WD controller 8 with the 12-volt relay 31 that is installed in the 12-volt electric power supply line in order to connect and disconnect the power to the clutch 12, which is preferably an electromagnetic clutch.

The circuitry that supplies the field current Ifg through the rectifying circuit 30 and the diode D1 forms a self excited circuit and the circuitry that supplies the field current Ifg through the battery 32 and the diode D2 forms a separately excited circuit. The diodes D1 and D2 function as a select-high mechanism that selects the higher voltage between the voltage of the self excited circuit and the voltage of the separately excited circuit.

The 4WD or 12-volt relay 31 is configured such that one end of its relay coil is connected to the output side of an ignition coil or relay 35 that is connected to the battery 32 through an ignition switch 34 and the other end of the relay coil connected to the 4WD controller 8.

The generator load torque Tg that the generator 7 imposes on the engine 2 and the generated voltage Vg are controlled by the 4WD controller 8 by adjusting the field current Ifg going through the field coil FC. The bipolar transistor 33 receives a pulse width modulated (PWM) generator control command (duty ratio or field current value) C1 from the 4WD controller 8 and adjusts the value of the field current Ifg of the generator 7 in accordance with the generator control command C1.

The motor relay 36 and the current sensor 37 are connected in series inside the junction box 10. The motor relay 36 connects and disconnects the electric power supplied to the electric motor 4 in accordance with a command from the 4WD controller 8. The current sensor 37 detects the armature current Ia supplied to the electric motor 4 from the generator 7 and outputs the detected armature current Ia to the 4WD controller 8. The motor voltage Vm of the electric motor 4 is detected at the 4WD controller 8.

As mentioned above, the field current Ifm of the electric motor 4 is controlled by a pulse width modulated field current control command, i.e., motor output torque command, from the 4WD controller 8 and the drive torque Tm is adjusted by adjusting the field current Ifm. The temperature of the electric motor 4 is detected by the thermistor 38 and the temperature detection value is fed to the 4WD controller 8. The rotational speed Nm of the output shaft of the electric motor 4 is detected by the motor rotational speed sensor 39 and the rotational speed Nm is also fed to the 4WD controller 8.

The electric clutch 12 has an excitation coil 12c having one end connected to the output side of the 4WD relay 31 and the other end connected to the 4WD controller 8. Inside of the 4WD controller 8, the other end of the excitation coil 12c is connected to ground via a switching transistor 40 that serves as a switching element. The current in the excitation coil 12c is controlled by a pulse width modulated clutch control command CL supplied to the base of the transistor 40. As a result, the torque transmitted to the rear wheels 3L and 3R (subordinate drive wheels) from the electric motor 4 is controlled.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

Figure 3:
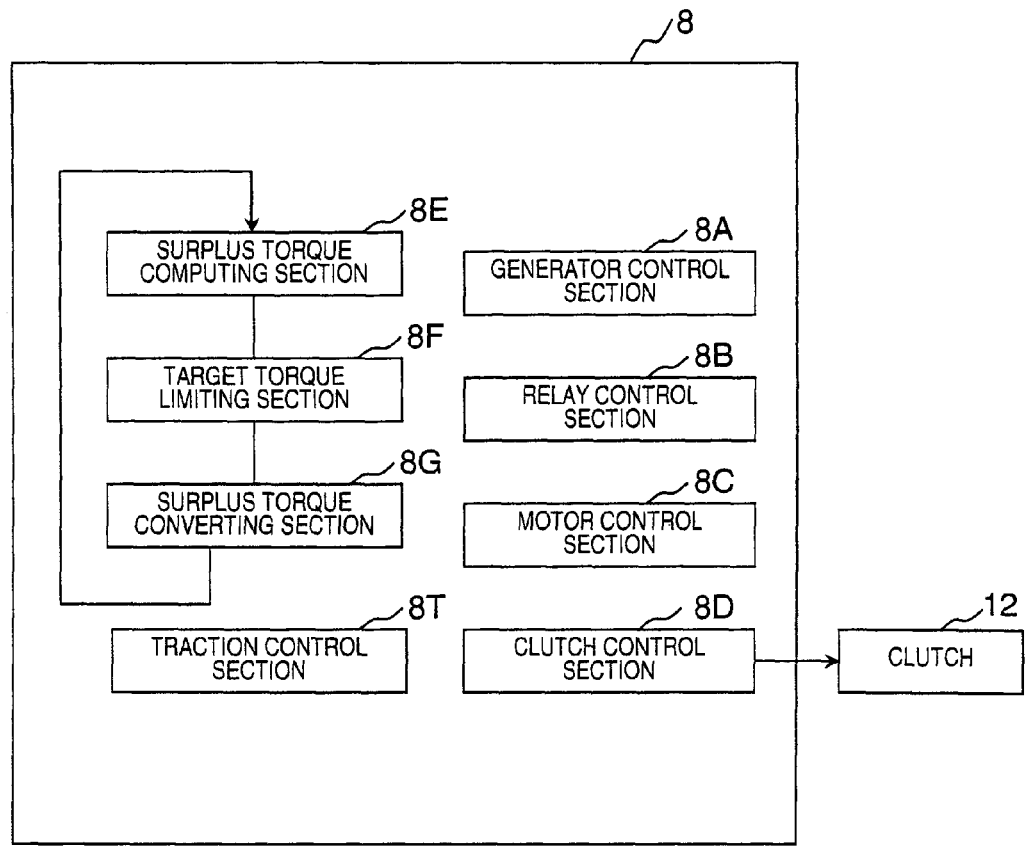
FIG. 3 is a functional block diagram showing the 4WD controller for the vehicle driving force control apparatus illustrated in FIG. 1 in accordance with the illustrated preferred embodiments of the present invention.

As shown in FIG. 3, the 4WD controller 8 includes a generator control section 8A, a relay control section 8B, a motor control section 8C, a clutch control section 8D, a surplus torque computing section 8E, a target torque limiting section 8F, a surplus torque converting section 8G and a traction control section 8T.

Figure 4:
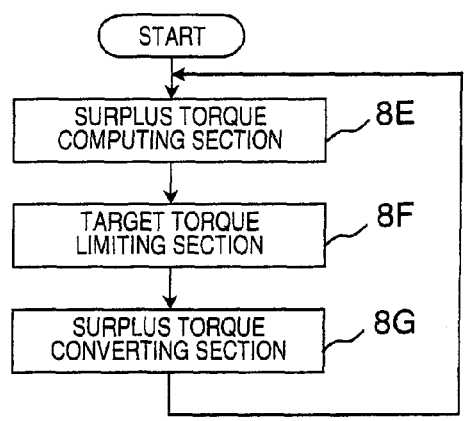
FIG. 4 is a flow chart showing the processing sequence executed by the 4WD controller for the vehicle driving force control apparatus illustrated in FIG. 1 in accordance with the illustrated embodiments of the present invention.

As shown in FIG. 4, at a prescribed sampling time cycle, the 4WD controller 8 executes the processing of the surplus torque computing section 8E, the target torque limiting section 8F, and the surplus torque converting section 8G in sequence based on the input signals. Together, the surplus torque computing section 8E, the target torque limiting section 8F, and the surplus torque converting section 8G constitute an output torque control section of the 4WD controller 8.

Through the bipolar transistor 45 of the voltage adjuster 22, the generator control section 8A monitors the generated voltage V of the generator 7 and adjusts the generated voltage Vg of the generator 7 to the required voltage by adjusting the field current Ifg of the generator 7. Thus, the generator control section 8A functions as a generation load torque adjusting section.

The relay control section 8B controls shutting off and connecting the electrical power supply from the generator 7 to the electric motor 4.

The motor control section 8C calculates a corresponding motor torque target value Tm based on the generator load torque target value Tgt computed by the surplus torque converting section 8G (discussed below). Thus, the clutch control section 8D controls the state of the clutch 12 by outputting a clutch control command to the clutch 12. The clutch control section 8D constitutes the clutch engagement control section of the present invention. Then the clutch control section 8D calculates the clutch transmission torque $T_{CL}$ of the electric clutch 12 by executing the calculation of the Equation (1) shown below based on the motor torque target value Tm. Next, the clutch control section 8D converts the clutch transmission torque $T_{CL}$ into a clutch current command value $I_{CL}$. The clutch control section 8D then pulse-width modulates (PMW) the clutch current command value $I_{CL}$, and calculates a clutch current control output CL having a duty ratio that corresponds to the clutch current command value $I_{CL}$. The clutch current control output CL is delivered to the switching transistor 40.

$$T_{CL}=Tmt \times K_{DEF} \times K_{TM}+T_{CL0} \quad (1)$$

In this Equation (1), $K_{DEF}$ is the reduction ratio of the differential gear 13, $K_{TM}$ is the clutch torque margin and $T_{CL0}$ is the clutch initial torque.

Figure 5:
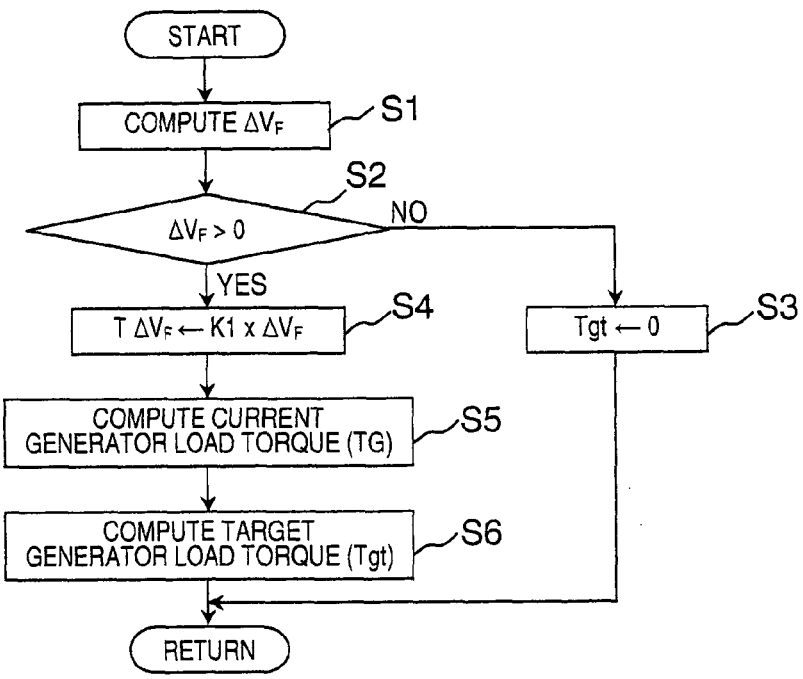
FIG. 5 is a flow chart showing the processing sequence executed by the surplus torque computing section of the 4WD controller for the vehicle driving force control apparatus illustrated in FIG. 1 in accordance with the illustrated embodiments of the present invention.

Next, the surplus torque computing section 8E will be discussed which executes the processing shown in FIG. 5. First, in step S1, the wheel speeds computed based on the signals from the wheel speed sensors 24FL, 24FR, 24RL and 24RR are used to subtract the wheel speed of the rear wheels 3L and 3R (subordinate drive wheels) from the wheel speed of the front wheels 1L and 1R (main drive wheels) and find the slippage speed $\Delta V_F$, which is the magnitude of the acceleration slippage of the front wheels 1L and 1R. Then, the 4WD controller 8 proceeds to step S2.

The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (2) and (3):

$$V_{Wf}=(V_{Wfl}+V_{Wfr})/2 \quad (2)$$

$$V_{Wr}=(V_{Wrl}+V_{Wrr})/2 \quad (3)$$

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as set forth in the following Equation (4):

$$\Delta V_F=V_{Wf}-V_{Wr} \quad (4)$$

In step S2, the 4WD controller 8 determines whether or not the calculated slippage speed $\Delta V_F$ exceeds a prescribed value, such as zero. Thus, steps S1 and S2 constitute an acceleration slippage detection section that estimates if acceleration slippage is occurring in the front wheels 1L and 1R that is driven by the internal combustion engine 2. If slippage speed $\Delta V_F$ is determined to be zero or below, it is estimated that the front wheels 1L and 1R are not experiencing acceleration slippage and the 4WD controller 8 proceeds to step S3, where a target generator load torque Tgt is set to zero. The 4WD controller 8 then proceeds to the target torque limiting section 8F process.

Conversely, if in step S2 slippage speed $\Delta V_F$ is determined to be larger than zero, it is estimated that the front wheels 1L and 1R are experiencing acceleration slippage, and thus, control proceeds to step S4.

In step S4, the absorption torque $T\Delta V_F$ required for suppressing the acceleration slippage of the front wheels 1L and 1R is calculated using the Equation (5) below and the 4WD controller 8 proceeds to step S5. The absorption torque $T\Delta V_F$ is an amount that is proportional to the acceleration slippage magnitude, as set forth in the following Equation (5):

$$T\Delta V_F = K1 \times \Delta V_F \qquad (5)$$

where: K1 is a gain that is found through experimentation or the like.

In step S5, a current load torque TG of the generator 7 is calculated based on the Equation (6) below, and then the 4WD controller 8 proceeds to step S6.

$$TG = K2 \frac{Vg \times Ia}{K3 \times Ng} \qquad (6)$$

where: Vg: voltage of the generator 7,
Ia: armature current of the generator 7,
Ng: rotational speed of the generator 7,
K3: efficiency, and
K2: coefficient.

In step S6, the surplus torque, i.e., the target generator load torque Tgt that the generator 7 should impose, is found based on the Equation (7) stated below, and the 4WD controller 8 returns to the beginning of the control loop.

$$Tgt = TG + T\Delta V_F \qquad (7)$$

Figure 6:
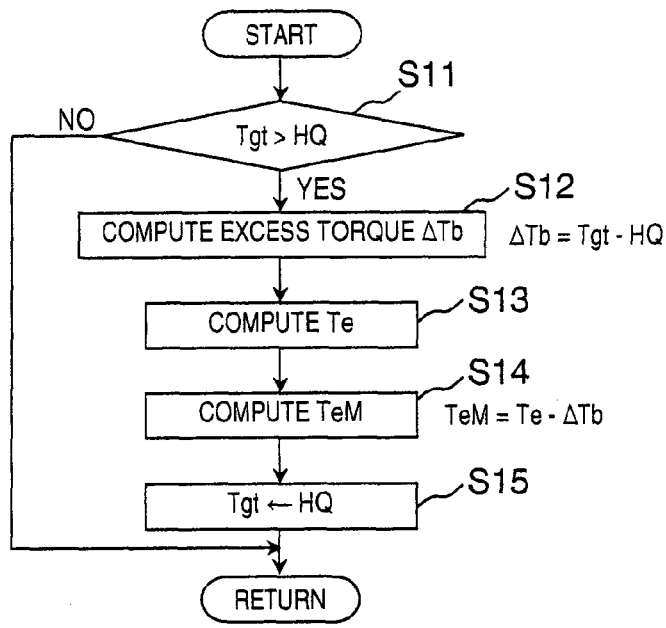
FIG. 6 is a flow chart showing the processing sequence executed by the target torque control (limiting) section of the 4WD controller for the vehicle driving force control apparatus illustrated in FIG. 1 in accordance with the illustrated embodiments of the present invention.
Figure 7:
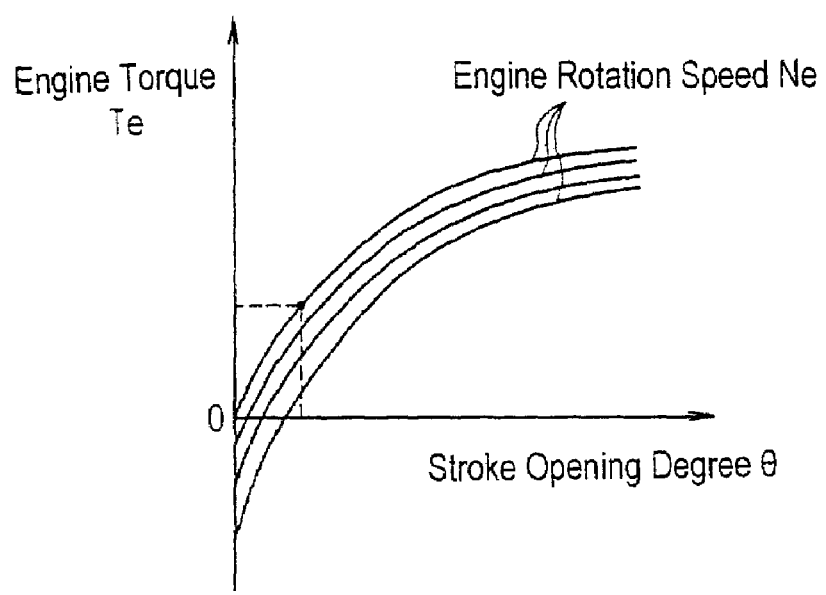
FIG. 7 is an engine torque calculation map showing the relationship between the throttle degree θ and the engine torque Te for different engine rotational speeds Ne.

Next, the processing executed by the target torque (control) limiting section 8F will be explained based on FIG. 6. The processing of the target generator load torque Tgt in the flow chart of FIG. 6 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step S11, the target torque limiting section 8F of the 4WD controller 8 determines whether or not the target generator load torque Tgt is larger than the maximum load capacity HQ of the generator 7. The 4WD controller 8 proceeds to the beginning of the control program to repeat the processing if the 4WD controller 8 determines that target generator load torque Tgt is less than or equal to the maximum load capacity HQ of the generator 7. Conversely, the 4WD controller 8 proceeds to step S12 if the 4WD controller 8 determines that the target generator load torque Tgt is larger than the maximum load capacity HQ of the generator 7.

In step S12, the excess torque $\Delta Tb$, which is a portion of target generation load torque Tgt that exceeds the maximum load capacity HQ, is found according to the following Equation (8):

$$\Delta Tb = Tgt - HQ. \qquad (8)$$

Then, the 4WD controller 8 proceeds to step S130.

In step S13, the current engine torque Te is computed based on the signals from the throttle sensor 19a and the engine rotational speed sensor 21 using an engine torque calculation map. Then, the 4WD controller 8 proceeds to step S14.

In step S14, the engine torque upper limit value TeM is calculated by subtracting the excess torque $\Delta Tb$ from the engine torque Te, as set forth in the following Equation (9):

$$TeM = Te - \Delta Tb. \qquad (9)$$

After the engine torque upper limit value TeM is outputted to the engine controller 18, the 4WD controller 8 proceeds to step S115.

In this equation, the engine controller 18 is not related to the operation of the accelerator pedal 17 by the operator but limits this engine torque Te such that the input engine torque upper limit value TeM becomes the upper limit value of the engine torque Te.

In step S15, the maximum load capacity HQ is assigned as the target generation load torque Tgt, and then the 4WD controller 8 process ends and proceeds to the surplus torque converting section 8G process.

Next, the processing executed by the surplus torque converting section 8G will be explained based on FIG. 8.

First, in step S20, the 4WD controller 8 determines if the vehicle is experiencing acceleration slippage by determining if the slippage speed $\Delta V_F$ is larger than zero. If the slippage speed $\alpha V_F$ is determined to be larger than zero, the 4WD controller 8 proceeds to step S22 because the front wheels 1L and 1R are experiencing acceleration slippage. If the 4WD controller 8 determines that the slippage speed $\Delta V_F$ is less than or equal to zero, then the 4WD controller 8 does not proceed to step S21 because the front wheels 1L and 1R are not experiencing acceleration slippage.

In step S21, a determination is made as to whether or not the vehicle is in a four wheel drive state by checking if the operating flag $F_{4WD}$ is set to "0". When the operating flag $F_{4WD}$ is set to "0", this represents that the electric motor 4 is not driven and the vehicle is in a two-wheel drive state. If this operating flag $F_{4WD}$ is set to "0", then the process ends without the surplus torque conversion process executing and returns to the surplus torque computing section 8E process. If the operating flag $F_{4WD}$ is set to "1", the process proceeds to step S23.

In contrast, when the result of the determination of step S20 is the slippage speed $\Delta V_F$ is determined to be larger than zero, the determination is that the front wheels 1L and 1R are experiencing acceleration slippage and the process proceeds to step S22. In step S22, the operating flag $F_{4WD}$ is set to "1", and the process proceeds to step S23.

Figure 8:
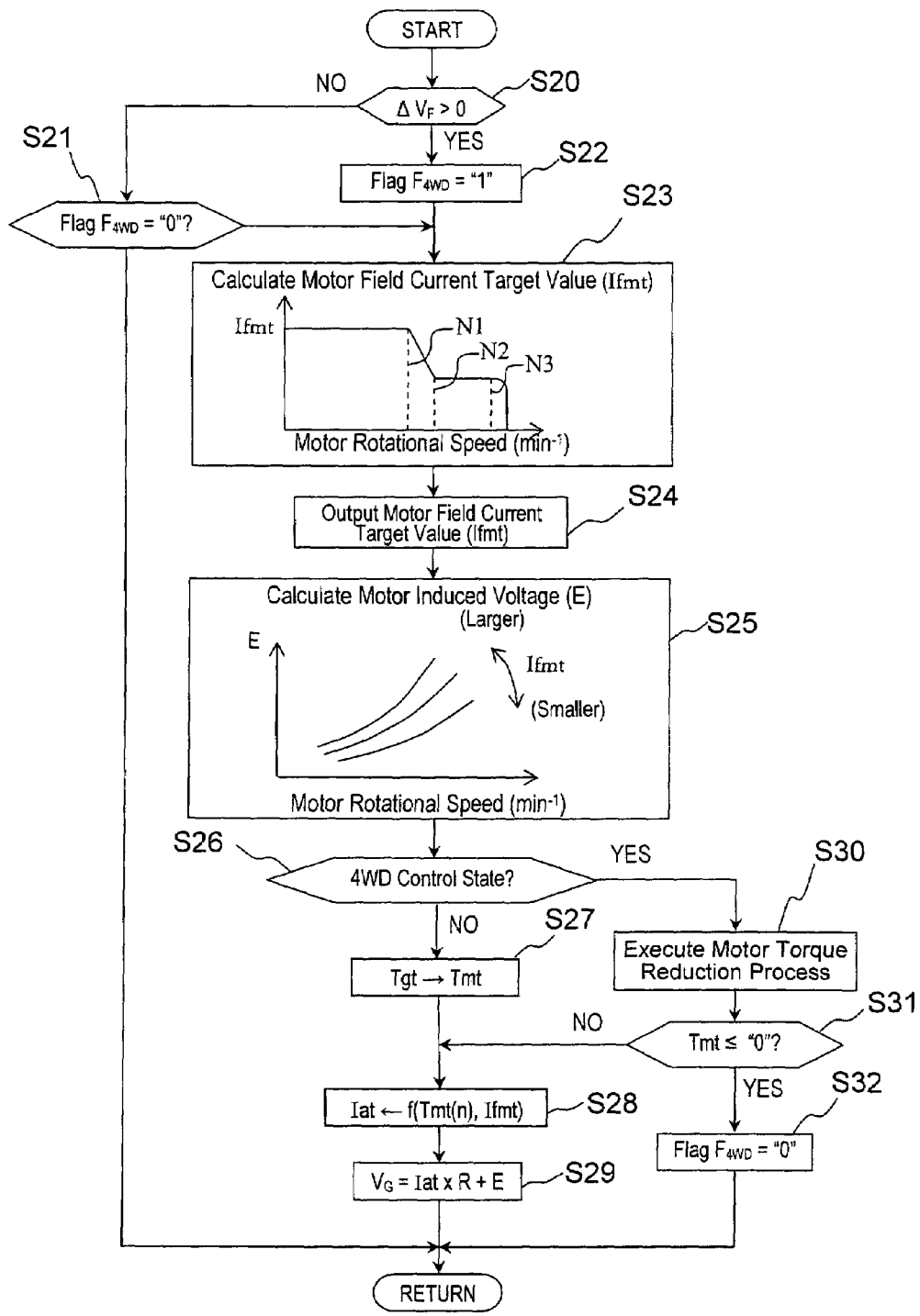
FIG. 8 is a flow chart showing the processing sequence executed by the surplus torque converting section of the 4WD controller for the vehicle driving force control apparatus illustrated in FIG. 1 in accordance with the first embodiment of the present invention.

In step S23, the rotational speed Nm of the motor 4 detected by the motor rotational speed sensor 39 is input and then based on that rotational speed Nm of the motor 4, the motor field current target value Ifmt is computed referencing the motor field current target value computation map shown in step S23 of FIG. 8.

The target motor field current calculation map was created based on the first gear of the drive range (D) of the automatic transmission 5, which is the gear with the highest gear ratio in that range. For example, the $1^{st}$ speed that is the largest gear ratio in the drive range (D) of the automatic transmission 5. The motor field current target value Ifmt follows a characteristic curve that is plotted with the motor rotational speed Nm on the horizontal axis and the motor field current target value Ifmt on the vertical axis as shown in FIG. 8. In the range of motor rotational speeds Nm from zero to the first predetermined value N1, the motor field current target value Ifmt holds at a preset maximum current value $I_{MAX}$. If the motor rotational speed increases beyond the predetermined value N1, the motor field current target value Ifmt decreases accordingly at a comparatively large slope. Then, at rotational speeds between a second predetermined value N2 that is larger than the first predetermined value N1 and a third predetermined value N3 that is larger than the second predetermined value N2, the motor field current target value Ifmt holds at a low current value $I_L$ that is smaller than the initial current value $I_{IN}$. If the motor rotational speed Nm increases further and exceeds the first predetermined value N3, the motor field current target value Ifmt decreases at a still larger slope until it reaches 0.

Thus, the field current of the electric motor 4 is held at a fixed prescribed current value $I_{MAX}$ in the range of rotational speeds Nm from 0 to the predetermined value N1 and reduced using a known using a known weak magnetic field control method when the electric motor 4 is rotating at a speed above the predetermined value N1 (see FIG. 8). In short, when the electric motor 4 rotates at a high speed the motor torque decreases due to the rise in the induced voltage E in the electric motor 4. Therefore, as discussed earlier, when the rotational speed Nm of the electric motor 4 reaches or exceeds the prescribed value N1, the current flowing to the electric motor 4 is increased and the required motor torque Tm is obtained by reducing the field current Ifm of the electric motor 4 and lowering the induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

Next, the process proceeds to step S24. In this step, the motor field current target value Ifmt computed in step S23 is output to the motor control section 8C and the process proceeds to step S25.

Next, the process proceeds to step S25. In step S25, the 4WD controller 8 calculates the motor induced voltage E based on the motor rotational speed Nm and the motor field current target value Ifmt calculated in step S23 using the motor induced voltage calculation map shown in FIG. 8. The motor induced voltage calculation map is configured such that curves for different motor field current target values Ifmt are plotted on a graph having the motor rotational speed Nm on the horizontal axis and the motor induced voltage E on the vertical axis. The motor induced voltage E increases substantially linearly as the motor rotational speed Nm increases, and the motor induced voltage E also increases as the motor field current target value Ifmt increases.

Next, the process proceeds to step S26. In this step a determination is made as to whether or not a four-wheel drive state is established. As an example, this determination determines whether or not the last motor torque target value Tmt(n−1) is equal to or less than the previously set motor torque threshold value $Tm_{TH}$. When the last motor torque target value Tmt(n−1) greater than less than the previously set motor torque threshold value $Tm_{TH}$, the determination is that a four-wheel drive state is not established and the process proceeds to step S27. When the last motor torque target value Tmt(n−1) less than the previously set motor torque threshold value $Tm_{TH}$, the determination is that a four-wheel drive state is established and the process proceeds to step S30.

In step S27, the corresponding motor torque target value Tmt is computed based on the generated power load torque target value Tgt computed by the surplus torque computing section 8E and the process proceeds to step S28.

Figure 9:
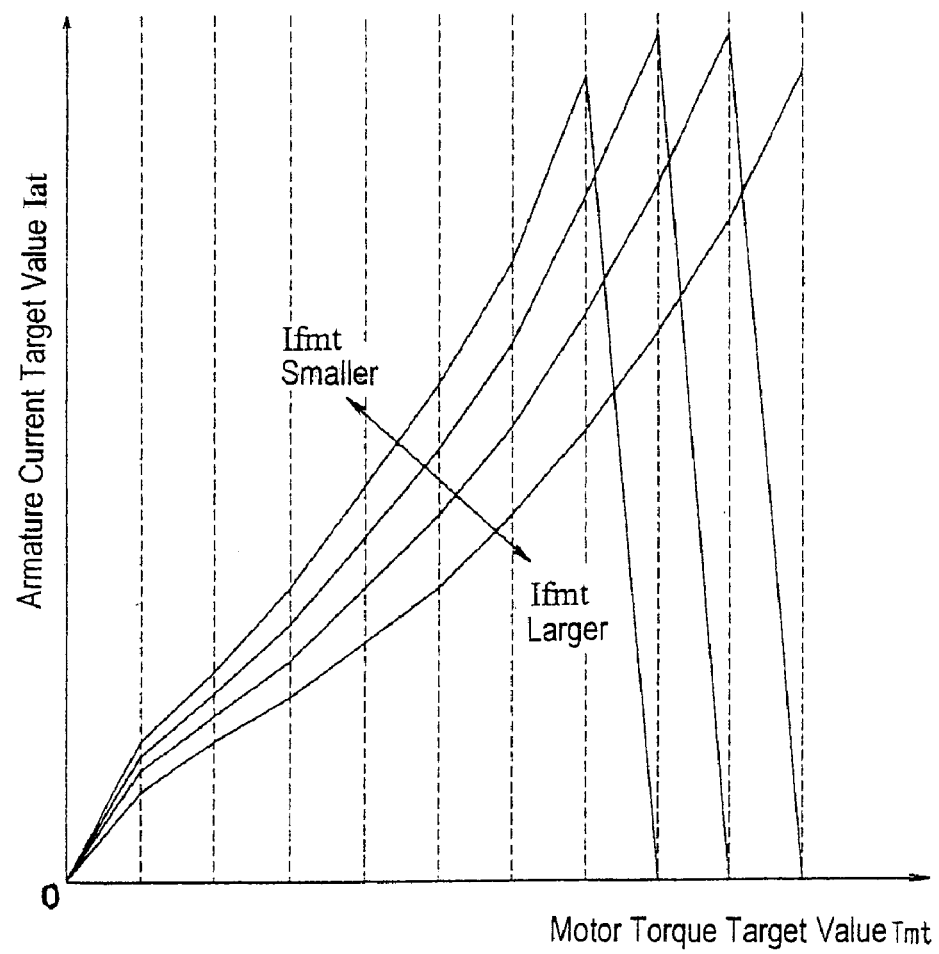
FIG. 9 is an armature current target value calculating map showing the relationship between the motor torque target value and the armature current target value for different motor field current target values.

In step S28, the 4WD controller 8 calculates the armature current value Iat based on the motor torque target value Tmt and the motor field current target value Ifmt using the armature current target value calculation map shown in FIG. 9. The armature current target value calculation map is configured such that curves for different motor field current target values Ifmt are plotted on a graph having the motor torque target value Tmt on the horizontal axis and the armature current target value Iat on the vertical axis. When the motor output torque Tmt is zero, the armature current target value Iat is zero regardless of the value of the motor field current target value Ifmt. As the motor output torque Tm increases the armature current target value Iat increases, but as the motor field current target value Ifmt increases the armature current target value Iat decreases. When the motor output torque Tmt becomes larger, the armature current target values Iat go to zero sequentially in order from the smallest motor field current target value Ifmt.

Next, the process proceeds to step S29. In this step, after computing the armature current target value Iat, the resistance of the electrical line 9 and the combined resistance R of the coil resistance of the motor 4, as well as the voltage target value VG of the generators from the induced voltage E based on the following equation (9), the process ends and then returns to the surplus torque computing section 8E.

$$V_G = Iat \times R + E \qquad (9)$$

In contrast, in step S30, after executing the motor torque reduction process in which the value obtained by subtracting the prescribed reduction amount ΔTmt from the last motor torque target value Tmt(n−1) is computed as the current motor torque target value Tmt(n) (=Tmt(n−1−ΔTmt), the process proceeds to steps S31. In this step, a determination is made as to whether or not the motor torque target value Tmt(n) is equal to or less than "0". When the motor torque target value Tmt(n) greater than zero, the process proceeds to step S28. When Tmt(n) less than or equal to 0, the process proceeds to step S32.

In step S30, the operating flag $F_{4WD}$ is reset to "0" indicating a transition to a two-wheel drive state. After the operating flag $F_{4WD}$ is reset to "0", the process ends.

Figure 10:
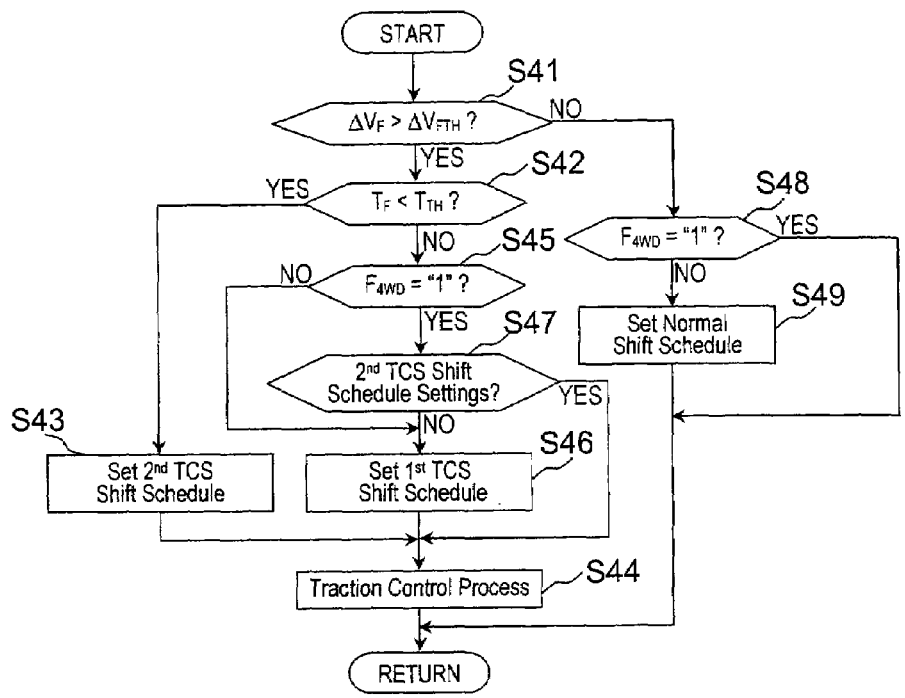
FIG. 10 is a flow chart showing the processing sequence executed by the traction control section for the vehicle driving force control apparatus illustrated in FIG. 1 in accordance with the first embodiment of the present invention.

The traction control section 8T also executes the traction control process shown in FIG. 10. The traction control section 8T uses the shift schedule such as the one shown in FIG. 11 to change the shift point of the automatic transmission 5. The shift schedule shown in FIG. 11 has three shift schedules. Each shift schedule includes one or more upshift variable speed lines for upshifting from a low (first) speed gear position to a high (second) speed gear position of the transmission 5. For example, the $1^{st}$ TCS shift schedule uses the $1^{st}$ traction control variable speed line $L_{TC1}$ of FIG. 11 for upshifting from a first (low) speed gear position to a second (high) speed gear position of the transmission 5, while the $2^{nd}$ TCS shift schedule uses the $2^{nd}$ traction control variable speed line $L_{TC2}$ of FIG. 11 for upshifting from a first (low) speed gear position to a second (high) speed gear position of the transmission 5.

This traction control process is executed as a timer interrupt process at each of a prescribed time (for example, 10 msec). At first, in step S41, a determination is made as to whether or not the slippage speed $\Delta V_F$ is larger then a preset slippage speed threshold value $\Delta V_{FTH}$. When the slippage speed $\Delta V_F$ greater than preset slippage speed threshold value $\Delta V_{FTH}$, the result of the determination is that acceleration slippage is occurring at the front wheels 1L and 1R and the process proceeds to step S42.

Then, in step S42, a determination is made as to whether or not the front wheel drive torque $T_F$, read from the torque sensor 27, is smaller than the preset drive torque threshold value $T_{TH}$. When the front wheel drive torque $T_F$ less than the preset drive torque threshold value $T_{TH}$, the process proceeds to step S43.

In step S43, the traction control section 8T sets the $2^{nd}$ TCS shift schedule for the automatic transmission 5. The $2^{nd}$ TCS shift schedule uses the $2^{nd}$ traction control variable speed line $L_{TC2}$ of FIG. 11 that sets the upshift variable speed line to a vehicle speed higher than the normal variable speed line $L_U$ indicated by the solid lines of the dot and dashed lines. This upshift variable speed line uses the variable speed map, shown in FIG. 11 for the transmission controller 41 that controls the variable speed of the automatic transmission 5, to upshift from the 1 st speed gear position to the 2nd speed gear position. Thereafter, the process proceeds to step S44.

In this process of step S44, the traction control section 8T executes the traction control process to control the wheel torque. In particular, the throttle opening degree of the sub throttle valve 16 that controls the slippage speed $\Delta V_F$ is set and this value is outputted to the motor controller 20. Also, during the traction control process, a fuel control process is carried out to cut fuel to the internal combustion engine 2 and/or a braking process that provides a braking force to the front drive wheels 1L and 1R. After this the timer interrupt process ends.

Meanwhile, when the determination of step S42 results in the front wheel drive torque $T_F$ being determined to be greater than or equal to the preset drive torque threshold value $T_{TH}$, then the process proceeds to step S45.

In step S45, a determination is made by the 4WD controller 8 as to whether or not the operating flag $F_{4WD}$ is set to "1" by the surplus torque converting section 8G discussed earlier. If this operating flag $F_{4WD}$ is set to "0", then the process proceeds to step S46.

Figure 11:
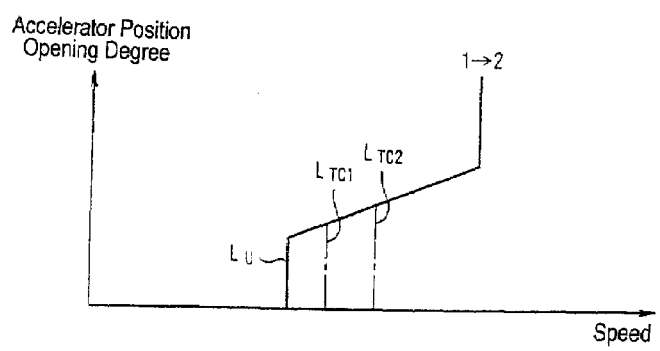
FIG. 11 is an explanatory graph showing a variable speed map for the vehicle driving force control apparatus illustrated in FIG. 1 in accordance with the first embodiment of the present invention.

In step S46, the 4WD controller 8 sets the $1^{st}$ TCS shift schedule that uses the $1^{st}$ traction control variable speed line $L_{TC1}$ which is located at the vehicle speed position midway between the normal variable speed line $L_U$ for the transmission controller 41 indicated by the dot and dashed lines in FIG. 11 and the 2nd traction control variable speed line $L_{TC2}$. After this, the process proceeds to step S44, where the traction control section 8T executes the traction control process as discussed earlier.

Meanwhile, when the determination of step S45 results in a determination that the operating flag $F_{4WD}$ is set to "0", then the process proceeds to step S47. In this step, a determination is made as to whether or not the $2^{nd}$ TCS schedule is set. When the $2^{nd}$ TCS schedule is set, the process proceeds to step S44, where the traction control section 8T executes the traction control process, as discussed earlier, using the $2^{nd}$ TCS schedule as is without any changes. When the $2^{nd}$ TCS schedule is not set, the process proceeds to step S46, where the $1^{st}$ TCS shift schedule is set as the current shift schedule as discussed earlier.

When the determination of step S41 results in $\Delta V_F$ less than or equal to 0, the determination is that acceleration slippage has not occurred and the process proceeds to step S48. Then, a determination is made as to whether or not the operating flag $F_{4WD}$ of the surplus torque converting section 8G is set to "1". When this operating flag $F_{4WD}$ is set to "1", the timer interrupt process ends as is without any changes. When the operating flag $F_{4WD}$ is set to "0", the process proceeds to step S49 and sets a normal schedule that selects the normal variable speed line $L_U$ for the transmission controller 41 indicated by the solid lines in FIG. 11 and then ends the timer interrupt process.

The process of steps S45, S47 and S48 in FIG. 10 corresponds to the shift schedule change prohibit section since the shift schedule remains unchanged (i.e., shift schedule change is prohibited) when the determinations in steps S45 and S47 are "Yes", or the determination in step S48 is "Yes". The process of steps S42, S45 and S48 also constitute the power sufficiency determining section. Also, the process of steps S43, S46 and S49 corresponds to the shift schedule change section.

Next, the operation of the first embodiment will be discussed referring to the timing charts of FIG. 12.

Now, by placing the selector lever of the automatic transmission to the parking range (P) and turning the ignition switch ON, the internal combustion engine 2 will start with the vehicle in a stopped state.

Figure 12:
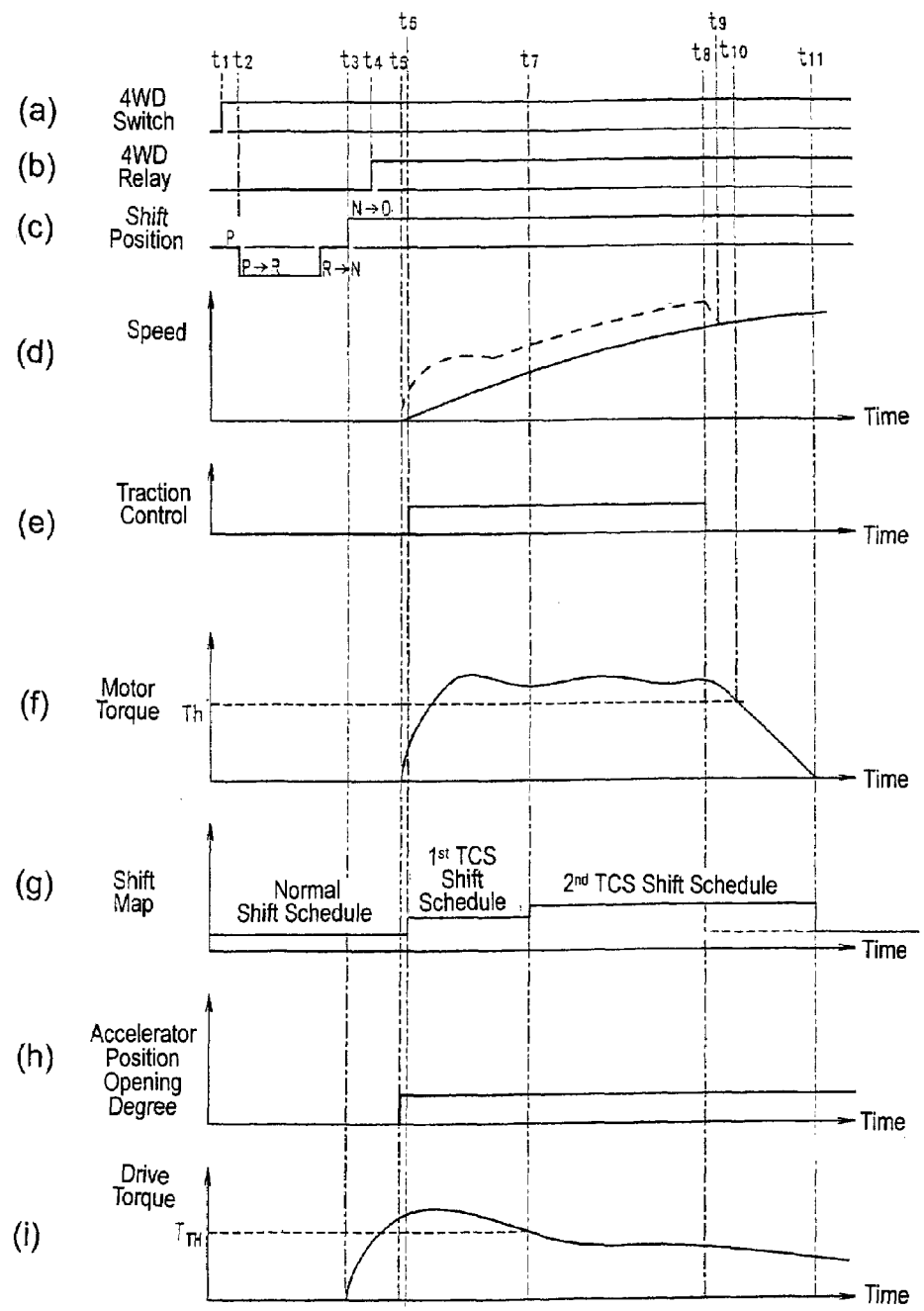
FIG. 12 are timing charts which provide explanations for the operation for the vehicle driving force control apparatus illustrated in FIG. 1 in accordance with the first embodiment of the present invention.

As shown in the graph (a) of FIG. 12, the operator sets the 4WD switch 26 to ON in this stopped state at a time t1. At this time t1, because the selector lever is set to the parking range as shown in the graph (c) of FIG. 12, the relay control section 8B governs the 4WD relay 31 to an OFF state and the input of the power system power supply is stopped to the 4WD controller 8. This occurs along with the supply of electrical power from the battery 32 to the field coil FC of the generator 7, the motor relay 36 of the junction box 10, and the clutch coil 12a of the electromagnetic clutch 12 being stopped.

From this stopped state, the operator then shifts the selector lever from the parking position (P) to the drive range (D) through the reverse position (R) and the neutral position (N) at time t2 and selects the drive range (D) at time t3. Thereafter, as shown in the graph (b) of FIG. 12, the 4WD relay 31 is governed to an ON state by the relay control section 8B at time t4 at which a prescribed time of for example, about 0.05 seconds has passed.

Because the vehicle is stopped in this state, the average front wheel speed $V_{Wf}$ of the front wheels 1L and 1R and the average rear wheel speed $V_{Wr}$ of the rear wheels 3L and 3R are both "0" and the slippage speed $\Delta V_F$ is also "0". Because of this, an initialization process executed when the ignition switch is set to ON resets the operating flag $F_{4WD}$ to "0" in the processing of FIG. 8 executed by the surplus torque converting section 8G. This ends the process and returns to the surplus torque computing section 8E from step S20 to step S21 without executing the processes of steps S22~S32.

Because of this, the generator control output C1 and the motor field output MF are both set to OFF by the generator control section 8A based on the generated voltage target value VG. The clutch control output CL is also set to OFF by the clutch control section 8D. Therefore, the power generated by the generator 7 and the drive of the electric motor 4 are stopped along with the clutch 12 being set to a clutch disengaged state.

Because of this state, at a time t5, if acceleration slippage occurs in the front wheels 1L and 1R (main drive wheels) due to the vehicle travelling in the forward direction on road surfaces with a low frictional coefficient, such as roads wet with rain, snow or frost, wheel speed differences of the front and rear wheels will make the slippage speed $\Delta V_F$ a positive value even if the accelerator pedal 17 is stepped down on strongly and vehicle quickly accelerates or the accelerator pedal 17 is not stepped down on strongly.

At this time, the clutch control output CL is controlled to a prescribed duty rate by the clutch control section 8D setting the clutch 12 to a clutch engaged state. Because the slippage speed $\Delta V_F$ changes to a positive value in the processing of FIG. 5 in the surplus torque computing section 8E simultaneous with this, the process proceeds from step S2 to step S4. Then, the required absorption torque $T\Delta V_F$ is computed in order to multiply the gain K1 by the slippage speed $\Delta V_F$ and restrain the acceleration slippage. Next, the equation (5) discussed earlier is used to compute the current generated load torque TG (step S5) based on the current generated voltage Vg, armature current Ia and generator rotational speed Ng. Since this current generated load torque TG has a comparatively small generator rotational speed Ng while the vehicle is traveling, it will increases in proportion to increases in the generated voltage Vg and the armature current Ia. Also, since the absorption torque $T\Delta V_F$ and the current generated load torque TG are multiplied to compute the generated load torque target value Tgt, this generated load torque target value Tgt increases as well.

The generated voltage Vg produced by the generator 7 is controlled by the processing of FIG. 8 of the surplus torque converting section 8G. Since the slippage speed $\Delta V_F$ is a positive value, the process proceeds to step S22 and the operating flag $F_{4WD}$ is set to "1". Next, the process proceeds to step S23. In this process, the voltage value obtained by multiplying the running resistance R by the armature current target value Iat computed by referencing the armature current target value computing map of FIG. 9 based on the motor torque target value Tmt and the motor field current target value Ifmt is added to the induced voltage E in the motor 4 and this sum obtained.

Hereupon, the motor field current target value Ifmt is computed referencing the motor field current target value computation map in step S23 in the processing of FIG. 8 based on the motor rotational speed Nm. Because the motor rotational speed Nm is still slow while the vehicle is travelling, the motor field current target value Ifmt at this time is set to the maximum current value $I_{MAX}$.

The computed motor field current target value Ifmt is output to the motor control section 8C as is without any changes which in turn starts driving of the motor 4 (step S24).

Because the motor induced voltage E, computed in step S25, also increases at this time, the armature current target value Iat, computed in step S27, rises with the passage of time and, as shown in the graph (f) of FIG. 12, the motor torque Tm increases as well. The rear wheels 3L and 3R start driving by means of transferring this increase to the rear wheels. While this occurs, the electromagnetic clutch 12 is also set to a linked state by the clutch control section 8D.

As a result, when acceleration slippage occurs in the front wheels 1L and 1R (main drive wheels) when quickly accelerating or travelling on road surfaces with a low frictional coefficient, the rear wheels 3L and 3R (subordinate drive wheels) are driven by the motor 4 so as to cancel the acceleration slippage in the front wheels 1L and 1R thereby making it possible to travel in the vehicle smoothly.

During this time, in the traction control section 8T, the shift schedule for the transmission controller 41 is set to a normal shift schedule by the initialization process executing at the time when the ignition switch is set to ON and the slippage speed $\Delta V_F$ does not exceed the slippage speed threshold value $\Delta V_{FTH}$. For that reason, the process proceeds from step S41 to step S48 and even if the operating flag $F_{4WD}$ is set to "1", the normal shift schedule will continue to be set as is without any changes.

Thereafter, if the slippage speed $\Delta V_F$ exceeds the slippage speed threshold value $\Delta V_{FTH}$, at a time t6 the process will proceed from step S41 to step S42 in the processing of FIG. 10 in the traction control section 8T. As shown in the graph (i) of FIG. 12, the front wheel drive torque $T_F$ will exceed the drive torque threshold value $T_{TH}$ at time t3 when the drive range (D) was selected. Because of this the process proceeds to step S45. Hereupon, because the operating flag $F_{4WD}$ is set to "1",
the process proceeds to step S47 and a normal shift schedule is set. Since the $2^{nd}$ TCS shift schedule is not set, the process proceeds to step S46 and the $1^{st}$ TCS shift schedule is set for the transmission controller 41. Thereafter, the process proceeds to step S44 and the throttle opening degree of the sub throttle valve 16 is reduced. This occurs along with the process to cut fuel to the internal combustion engine 2 as necessary and the application of a braking force to the front wheels 1L and 1R (drive wheels). Then, the acceleration slippage of the front wheels indicated by the dashed lines in the graph (d) of FIG. 12 is restrained, and the acceleration is faster than the rear wheel vehicle speed indicated by the solid lines by the amount of the slippage speed threshold value $\Delta V_{FTH}$ only.

After this, the motor torque Tm is controlled to an almost uniform value after rising quickly as shown in the graph (f) of FIG. 12. Then, if the front wheel drive torque $T_F$ decreases gradually and, at time t7, drops to a value less than the drive torque threshold value $T_{TH}$ due to the vehicle traveling on road surfaces with a low frictional coefficient, such as roads slick with snow or frost, then the process proceeds from step S42 to step S43 in the processing of FIG. 10. In step S42 to step S43 in the processing of FIG. 10, the $2^{nd}$ TCS shift schedule for the transmission controller 41 is set, and the upshift variable speed line from the 1st speed gear position to the 2nd speed gear position of the automatic transmission 5 is changed to a higher vehicle speed.

Thereafter, at a time 8t, when the acceleration slippage in the front wheels subsides and the slippage speed $\Delta V_F$ is equal to or less than the slippage speed threshold value $\Delta V_F$, the process proceeds from step S41 to step S48. The fact that the operating flag $F_{4WD}$ continues to set to "1", however, maintains the shift schedule at the $2^{nd}$ TCS shift schedule as shown in the graph (g) of FIG. 12.

Then, if the front wheels 1L and 1R speeds and the rear wheels 3L and 3R speeds almost coincide at a time t9, the slippage speed $\Delta V_F$ will become "0" and the process proceeds from step S20 to step S21 in the processing of FIG. 8. Because the operating flag $F_{4WD}$ continues to set to "1", the process proceeds to step S23 and the control state of the electric motor 4 is maintained.

Thereafter, if the motor torque target value Tmt is equal to or less than the motor torque threshold value Th, then the process proceeds from step S26 to step S30 in the processing of FIG. 8 by establishing a four-wheel drive state and then by executing the motor torque reduction process, the motor torque target value Tmt is sequentially reduced by a prescribed reduction value $\Delta T$. The motor torque Tm also reduces following a fixed slope in proportion to the reduction of the motor torque target value Tmt. If the motor torque target value Tmt is equal to or less than "0" at a time t11, then the process proceeds to step S32 where the operating flag $F_{4WD}$ is reset to "0". The processing will then complete as is from step S21.

If the operating flag $F_{4WD}$ is reset to "0" in this manner, the process proceeds from step S48 to step S49 in the traction control process of FIG. 10 and the shift schedule is restored to a normal shift schedule.

According to the embodiment discussed above, as a result of starting the traction control, the shift schedule of the transmission controller 41 is changed to the $1^{st}$ traction control variable speed line $L_{TC1}$ set by the $1^{st}$ TCS shift schedule with a vehicle speed higher than the normal variable speed line $L_U$ that upshifts from the $1^{st}$ speed gear position to the 2nd speed gear position in a normal shift schedule. In addition, when the road surface has a small frictional resistance, the upshift to the 2nd speed gear position is restrained thereby allowing favorable traction control by means of changing to the $2^{nd}$ traction control variable speed line $L_{TC2}$ set by the $2^{nd}$ TCS shift schedule with a vehicle speed higher than the $1^{st}$ traction control variable speed line $L_{TC1}$.

Although traction control will end when the slippage speed $\Delta V_F$ reduces to a value equal to or lower than the slippage speed threshold value $\Delta V_{FTH}$ and the shift schedule of the transmission controller 41 returns to a normal shift schedule, the torque conversion process of FIG. 8, that drives the electric motor 4, will not end the four-wheel drive state until the motor torque target value Tmt is equal to or less than the motor torque threshold value Th even if the slippage speed $\Delta V_F$ is "0". Even after the traction control ends, the control will continue. Because the torque conversion process, after this traction control ends, prohibits the shift schedule from being restored to the normal shift schedule and maintains the $2^{nd}$ TSC shift schedule, there will be not upshift to the 2nd speed gear position and the $1^{st}$ gear position will be maintained even if the accelerator position opening degree is low and there is an interval between the normal variable speed line $L_U$ and the $2^{nd}$ traction control variable speed line $L_{TC2}$. This makes it possible to maintain the power generation capacity of the generator 7 and execute accurate torque control of the electric motor 4 without any reductions in the engine rotational speed Ne.

In contrast to this, when the shift schedule is restored to the normal shift schedule at the time when the traction control ends as indicated by the dashed lines in the graph (d) of FIG. 12, the action of the automatic transmission 5 upshifting from the 1st speed gear position to the 2nd speed gear position when the accelerator position opening degree is low and the vehicle speed is between the normal variable speed line $L_U$ and the $2^{nd}$ traction control variable speed line $L_{TC2}$ will reduce the engine rotational speed Ne. Then, the quantity of power generated by the generator 7 will reduce in proportion to the reductions in the engine rotational speed Ne leading to the following problems.

A problem of insufficient power generation that makes it impossible to ensure the quantity of power generation required to ensure the armature current Ia that the generator 7 requires for the electric motor 4 or a problem of not being able to generate power in which the quantity of power generated by the generator 7, in its worst state, is less than the induced electrical power of the electric motor. A problem of poor control that does not allow motor torque required by the electric motor 4 to be generated.

Because the embodiment discussed above prohibits changes to shift schedules that return shift schedules set to variable speed lines with vehicle speeds higher than the normal variable speed line $L_U$ to the normal variable speed line $L_U$, this embodiment reliably prevents the automatic transmission from upshifting to the $2^{nd}$ speed gear position and maintains the $1^{st}$ speed gear position thereby making it possible to reliably prevent the occurrence of insufficient power generation by the generator 7.

The embodiment discussed above described when changing the shift schedule up to the $2^{nd}$ TCS shift schedule while the vehicle is travelling on road surfaces with a low frictional coefficient, such as roads slick with snow or frost. When travelling on road surfaces with a small mid level frictional coefficient, such as roads wet with falling rain however, the $1^{st}$ TCS shift schedule will be maintained without the amount of reduction of the front wheel drive torque $T_F$ becoming smaller and dropping to a value less than the drive torque threshold value $T_{TH}$. For this case as well, the shift schedule returning to a normal shift schedule at the time when traction control ends is also prohibited. In the processing of FIG. 10, although the process proceeds from step S42 to step S45 when the front wheel drive torque $T_F$ once again exceeds than the drive torque threshold value $T_{TH}$ while travelling on road surfaces with a small mid level frictional coefficient after the front wheel drive torque $T_F$ drops to a value less than the drive torque threshold value $T_{TH}$, the operating flag $F_{4WD}$ is set to "1" and the shift schedules are set to the $2^{nd}$ TCS shift schedule up until the last. Because of this, the process proceeds to step S44 directly without proceeding from step S47 to step S46 and the $2^{nd}$ TCS variable speed line $L_{TC2}$ is prohibited from returning to the $1^{st}$ TCS variable speed line $L_{TC1}$ thereby making it possible to reliably prohibit the automatic transmission 5 from upshifting from the 1st speed gear position to the 2nd speed gear position.

The embodiment discussed above described a case when the automatic transmission 5 was used but the invention is not limited to such a method. A belt drive non-stage transmission or a toroidal type non-stage transmission can also be used. For this case, the gear ratio can be detected by detecting the rotational speed on the input side and the rotational speed on the output side of the non-stage transmission to prohibit the transmission from shifting towards the direction of a smaller gear ratio.

Furthermore, the embodiment discussed above described a case in which the generated voltage Vg of the generator 7 is computed based on the armature current target value Iat and the motor induced voltage E to control the field control output MF of the generator 7 based on this generated voltage Vg but the invention is not limited to such a method. It is also possible to either multiply a proportional control gain by the value of deviations ΔIa between the armature current target value Iat and the actual armature current Ia supplied to the electric motor 4 detected by the current sensor 37 or to multiply a integrated control gain by an integral value of the deviations ΔIa to compute the generator field current Ifg, compute the duty rate in proportion to this generator field current Ifg and supply a controlled power generation control output, with this duty rate, to the bipolar transistor 33.

Even further, the embodiment discussed above described a case in which the electromagnetic clutch 12 was used as a clutch but the invention is not limited to such a method. A fluid-pressure clutch can also be used. For this case, the clutch linkage force can be controlled by means of electrically controlling a pressure control valve that controls the fluid pressure supplied to the fluid-pressure clutch. Any type of other clutches that can electrically control the clutch linkage force can also be used.

Even further, the embodiment discussed above described a case in which the input shaft of the generator 7 was linked to the internal combustion engine 2 through a belt 6 but the invention is not limited to such a method. The input shaft of the generator 7 can be linked to a rotating part from the output side of the transfer case up until the front wheels 1L and 1R. For this case, the engine load when idling is also reduced.

Even further, the embodiment discussed above described a case in which the motor rotational speed sensor 39 was used as a motor rotational speed detection method and directly detect the motor rotational speed Nm using this motor rotational speed sensor 39 but the invention is not limited to such a method. The motor rotational speed can be estimated based on the wheel speeds $V_{WRL}$ and $V_{WRR}$ detected by the wheel speed sensors 24RL and 24RR and the reduction ratio of the differential gear 13.

Even further, the embodiment discussed above described a case in which the change to a four-wheel drive state is in proportion to the acceleration slippage of the front wheels but the invention is not limited to such a method. Changing to a four-wheel drive state can also be in proportion to the accelerator position opening degree.

In addition, the embodiment discussed above described a case in which the present invention was used in a four-wheel vehicle wherein the front wheels 1L and 1R are the main drive wheels and the rear wheels 1RL and 1RR are the subordinate drive wheels but the invention is not limited to such a method. The rear wheels 1RL and 1RR can be the main drive wheels and the front wheels 1L and 1R the subordinate drive wheels.

Even further, the embodiment discussed above described a case in which the present invention was used in a four-wheel drive vehicle but the invention is not limited to such a method. The present invention can be used in vehicles comprising two or more wheels wherein a portion of the main drive wheel(s) are driven by an internal combustion engine and the remaining subordinate drive wheel(s) are driven by an electric motor. The present invention can also be used in electrically driven apparatuses which drive electric motors which drive wheels utilizing a generator that is rotated by another rotational drive source such as an internal combustion engine.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-259160. The entire disclosure of Japanese Patent Application No. 2002-259160 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus of a vehicle comprising:
    an electric motor driven by electric power from a generator to supply torque to a first drive wheel;
    a main drive source coupled to the generator to mechanically drive the generator, the main drive source being configured and arranged to supply torque to a second drive wheel;
    a shift schedule change section configured to perform a transmission shift schedule changing operation from a first shift schedule of a transmission to a second shift schedule of the transmission upon detection of selected conditions indicating that a change from the first shift schedule to the second shift schedule is desired, the transmission shift schedule changing operation changing an rpm shift threshold for a given accelerator opening degree, the first shift schedule being used for shifting the transmission from one gear to a next adjacent gear, the second shift schedule being used for shifting the transmission from the one gear to the next adjacent gear;
    a power sufficiency determining section configured to determine whether generated power of the generator will be insufficient to drive the first drive wheel with an electromotive force from the generator to the electric motor if the transmission shift schedule changing operation is performed; and
    a shift schedule change prohibit section configured to prohibit the transmission shift schedule changing operation even when the selected conditions are detected, upon the power sufficiency determining section determining that the generated power of the generator will be insufficient if the transmission shift schedule changing operation is performed.

2. The vehicle driving force control apparatus as recited in claim 1, wherein
    the first and second shift schedules include upshift variable speed lines from a low speed gear position to a high speed gear position of the transmission; and
    the shift schedule change prohibit section is further configured to prohibit a change from the upshift variable speed line representing a higher vehicle speed toward the upshift variable speed line representing a lower vehicle speed.

3. The vehicle driving force control apparatus as recited in claim 1, wherein
    the shift schedule change section is further configured to perform the transmission shift schedule changing operation by changing between a normal upshift schedule and a traction control system upshift schedule when the selected conditions occur.

4. The vehicle driving force control apparatus as recited in claim 3, wherein
    the first and second shift schedules include upshift variable speed lines from a low speed gear position to a high speed gear position of the transmission; and
    the shift schedule change prohibit section is further configured to prohibit a change from the upshift variable speed line representing a higher vehicle speed toward the upshift variable speed line representing a lower vehicle speed.

5. The vehicle driving force control apparatus as recited in claim 2, further comprising
    an acceleration slippage detection section configured to estimate if acceleration slippage is occurring in a second wheel driven by the main drive source.

6. The vehicle driving force control apparatus as recited in claim 5, wherein
    the acceleration slippage detection section is further configured to determine the acceleration slippage from a comparison of vehicle wheel speeds between the first drive wheel driven by the electric motor and the second drive wheel driven by the main drive source.

7. The vehicle driving force control apparatus as recited in claim 5, wherein the traction control section is further configured to determine if a drive torque of the second drive wheel is below a prescribed drive torque threshold value, and to instruct the shift schedule change section to perform the transmission shift schedule changing operation to change from a normal variable speed line to a traction control variable speed line in which the traction control variable speed line sets the upshift variable speed line to a vehicle speed higher than the normal variable speed line.

8. The vehicle driving force control apparatus as recited in claim 1, further comprising a surplus torque computing section configured to compute a surplus torque that substantially corresponds to a difference magnitude by which a drive torque transferred from the main drive source to a second wheel exceeds a road surface reaction force limit torque of the first wheel;

a generator control section configured to control a generation load torque of the generator to substantially correspond to an acceleration slippage magnitude of the second wheel, when the acceleration slippage detection section estimates acceleration slippage occurring in the second drive wheel.

9. The vehicle driving force control apparatus as recited in claim 1, wherein the main drive source is an internal combustion engine.

10. The vehicle driving force control apparatus as recited in claim 5, further comprising a mode selection section configured to select one of a multi-wheel drive mode in which both the first drive wheel and the second drive wheel are driven and a non-all wheel drive mode in which the first drive wheel is not driven by the electric motor.

11. A vehicle driving force control apparatus of a vehicle comprising:

means for supplying torque to a first drive wheel by electric power from a generator;

means for supplying torque to a second drive wheel and for mechanically driving the generator;

means for changing a transmission shift schedule by changing an rpm shift threshold for a given accelerator opening degree for shifting the transmission from one gear to a next adjacent gear, upon detecting selected conditions indicating that a change from the first shift schedule to the second shift schedule is desired, and the transmission shift schedule being used;

means for determining whether generated power will be insufficient to drive the first drive wheel by supplying an electromotive force from the generator to the means for supplying torque to the first drive wheel by a change in the transmission shift schedule by the means for changing; and means for prohibiting a change of the transmission shift schedule by the means for changing even when the selected conditions are detected, upon the means for determining making a determination that the generated power will be insufficient if the transmission shift schedule changing operation is performed.

12. A method of controlling a vehicle having a generator driven by a main drive source and an electric motor driven by electric power from the generator, the method comprising:

supplying torque to a first drive wheel by driving the electric motor;

supplying torque to a second drive wheel by driving the main drive source;

outputting a command to perform a transmission shift schedule changing operation from a first shift schedule of a transmission to a second shift schedule upon detection of selected conditions indicating that a change from the first shift schedule to the second shift schedule is desired, the transmission shift schedule changing operation changing an rpm shift threshold for a given accelerator opening degree, the first shift schedule being used for shifting the transmission from one gear to a next adjacent gear, the second shift schedule being used for shifting the transmission from the one gear to the next adjacent gear;

determining whether generated power of the generator will be insufficient to drive the first drive wheel by supplying an electromotive force from the generator to the electric motor if the transmission shift schedule changing operation is performed; and prohibiting the transmission shift schedule changing operation even when the selected conditions are detected, upon determining that the generated power of the generator will be insufficient if the transmission schedule changing operation is performed.

* * * * *